United States Patent [19]
Morales

[11] Patent Number: 6,035,968
[45] Date of Patent: Mar. 14, 2000

[54] COLLAPSIBLE HUNTING STAND

[76] Inventor: Joe L. Morales, 4603 Nicole Cir., Houston, Tex. 77084

[21] Appl. No.: 09/271,850

[22] Filed: Mar. 18, 1999

[51] Int. Cl.[7] .................................................. A47C 7/62
[52] U.S. Cl. ............................ 182/141; 182/116; 43/901
[58] Field of Search ................................... 182/116, 141, 182/145, 142, 150; 248/168; 43/901

[56] References Cited

U.S. PATENT DOCUMENTS

| | | | |
|---|---|---|---|
| 284,360 | 9/1883 | Bauer | 182/150 |
| 453,044 | 5/1891 | Flanders | 182/145 |
| 3,568,796 | 3/1971 | Stanhope | 182/141 |
| 3,967,694 | 7/1976 | Woolfolk | 182/108 |
| 4,120,280 | 10/1978 | Iverson | 248/168 |
| 4,832,296 | 5/1989 | Schnepp | 248/168 |
| 5,025,715 | 6/1991 | Sir | 248/168 |
| 5,222,575 | 6/1993 | Santos | 182/108 |
| 5,301,770 | 4/1994 | Regan | 182/150 |

*Primary Examiner*—Alvin Chin-Shue

[57] ABSTRACT

A collapsible hunting stand for supporting a user above a ground surface. The collapsible hunting stand includes a top plate with upper ends of a plurality poles pivotally coupled thereto. A platform is positioned between the poles beneath the top plate. A pulley system connecting the platform to the top plate to permit raising and lowering of the platform.

12 Claims, 3 Drawing Sheets

COLLAPSIBLE HUNTING STAND

BACKGROUND OF THE INVENTION

1. Field of the Invention

The present invention relates to hunting stands and more particularly pertains to a new collapsible hunting stand for supporting a user above a ground surface.

2. Description of the Prior Art

The use of hunting stands is known in the prior art. More specifically, hunting stands heretofore devised and utilized are known to consist basically of familiar, expected and obvious structural configurations, notwithstanding the myriad of designs encompassed by the crowded prior art which have been developed for the fulfillment of countless objectives and requirements.

Known prior art includes U.S. Pat. No. 5,409,081 by Reeves; U.S. Pat. No. 5,195,611 by Untz; U.S. Pat. No. 5,009,238 by Prejean; U.S. Pat. No. 5,282,520 by Walker; U.S. Pat. No. 4,412,398 by Harmon; and U.S. Pat. No. Des. 270,474 by Haines et al.

While these devices fulfill their respective, particular objectives and requirements, the aforementioned patents do not disclose a new collapsible hunting stand. The inventive device includes a top plate with upper ends of a plurality poles pivotally coupled thereto. A platform is positioned between the poles beneath the top plate. A pulley system connecting the platform to the top plate to permit raising and lowering of the platform.

In these respects, the collapsible hunting stand according to the present invention substantially departs from the conventional concepts and designs of the prior art, and in so doing provides an apparatus primarily developed for the purpose of supporting a user above a ground surface.

SUMMARY OF THE INVENTION

In view of the foregoing disadvantages inherent in the known types of hunting stands now present in the prior art, the present invention provides a new collapsible hunting stand construction wherein the same can be utilized for supporting a user above a ground surface.

The general purpose of the present invention, which will be described subsequently in greater detail, is to provide a new collapsible hunting stand apparatus and method which has many of the advantages of the hunting stands mentioned heretofore and many novel features that result in a new collapsible hunting stand which is not anticipated, rendered obvious, suggested, or even implied by any of the prior art hunting stands, either alone or in any combination thereof.

To attain this, the present invention generally comprises a top plate with upper ends of a plurality poles pivotally coupled thereto. A platform is positioned between the poles beneath the top plate. A pulley system connecting the platform to the top plate to permit raising and lowering of the platform.

There has thus been outlined, rather broadly, the more important features of the invention in order that the detailed description thereof that follows may be better understood, and in order that the present contribution to the art may be better appreciated. There are additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new collapsible hunting stand apparatus and method which has many of the advantages of the hunting stands mentioned heretofore and many novel features that result in a new collapsible hunting stand which is not anticipated, rendered obvious, suggested, or even implied by any of the prior art hunting stands, either alone or in any combination thereof.

It is another object of the present invention to provide a new collapsible hunting stand which may be easily and efficiently manufactured and marketed.

It is a further object of the present invention to provide a new collapsible hunting stand which is of a durable and reliable construction.

An even further object of the present invention is to provide a new collapsible hunting stand which is susceptible of a low cost of manufacture with regard to both materials and labor, and which accordingly is then susceptible of low prices of sale to the consuming public, thereby making such collapsible hunting stand economically available to the buying public.

Still yet another object of the present invention is to provide a new collapsible hunting stand which provides in the apparatuses and methods of the prior art some of the advantages thereof, while simultaneously overcoming some of the disadvantages normally associated therewith.

Still another object of the present invention is to provide a new collapsible hunting stand for supporting a user above a ground surface.

Yet another object of the present invention is to provide a new collapsible hunting stand which includes a top plate with upper ends of a plurality poles pivotally coupled thereto. A platform is positioned between the poles beneath the top plate. A pulley system connecting the platform to the top plate to permit raising and lowering of the platform.

Still yet another object of the present invention is to provide a new collapsible hunting stand that may be carried by a user over rugged terrain and set up in remote locations.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be made to the accompanying drawings and descriptive matter in which there are illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein.

DESCRIPTION OF THE PREFERRED EMBODIMENT

Figure 1:
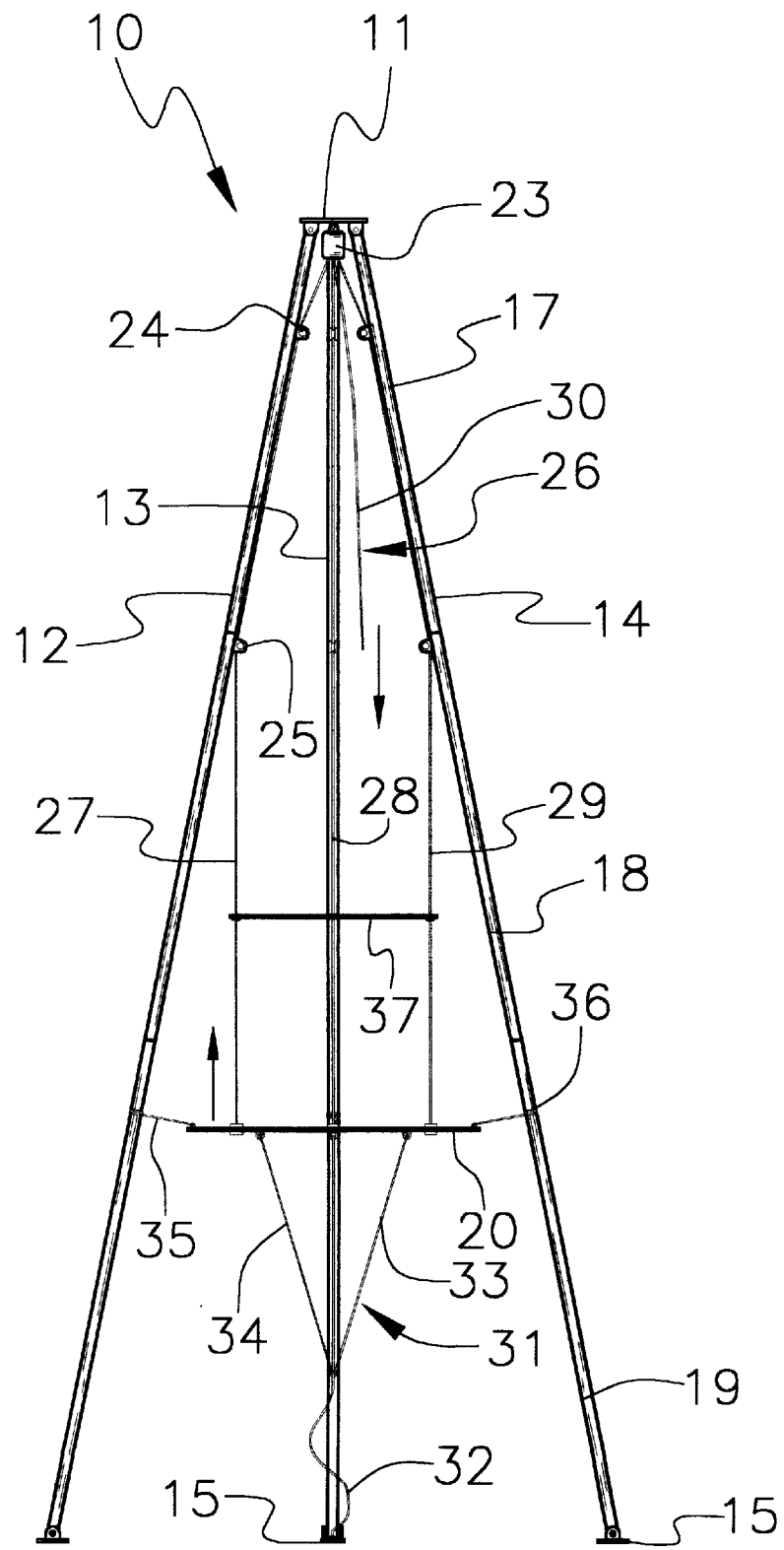
FIG. 1 is a schematic side view of a new collapsible hunting stand according to the present invention with the curtain removed.

With reference now to the drawings, and in particular to FIGS. 1 through 4 thereof, a new collapsible hunting stand embodying the principles and concepts of the present invention and generally designated by the reference numeral 10 will be described.

As best illustrated in FIGS. 1 through 4, the collapsible hunting stand 10 generally comprises a top plate with upper ends of a plurality poles pivotally coupled thereto. A platform is positioned between the poles beneath the top plate. A pulley system connecting the platform to the top plate to permit raising and lowering of the platform.

In closer detail, the stand 10 comprises a generally circular top plate 11 having a center and substantially planar top and bottom faces. A plurality of preferably tubular elongate poles 12,13,14 are provided each having opposite upper and lower ends and longitudinal axis extending between the upper and lower ends of the respective pole. Ideally, the plurality of poles comprises three poles to form a tripod. The upper ends of the are pivotally coupled to the bottom face of the top plate.

Each of the poles preferably has a ground engaging foot 15 pivotally coupled to the lower end of the respective pole. The feet of the poles are designed for resting on a ground surface such that the poles upwardly extend from the ground surface and support the top plate in generally horizontal position above the ground surface. The feet of the poles each preferably have a generally circular hole 16 therethrough to permit a ground spike to be extended through each foot into the ground surface to anchor each foot to the ground surface.

Figure 4:
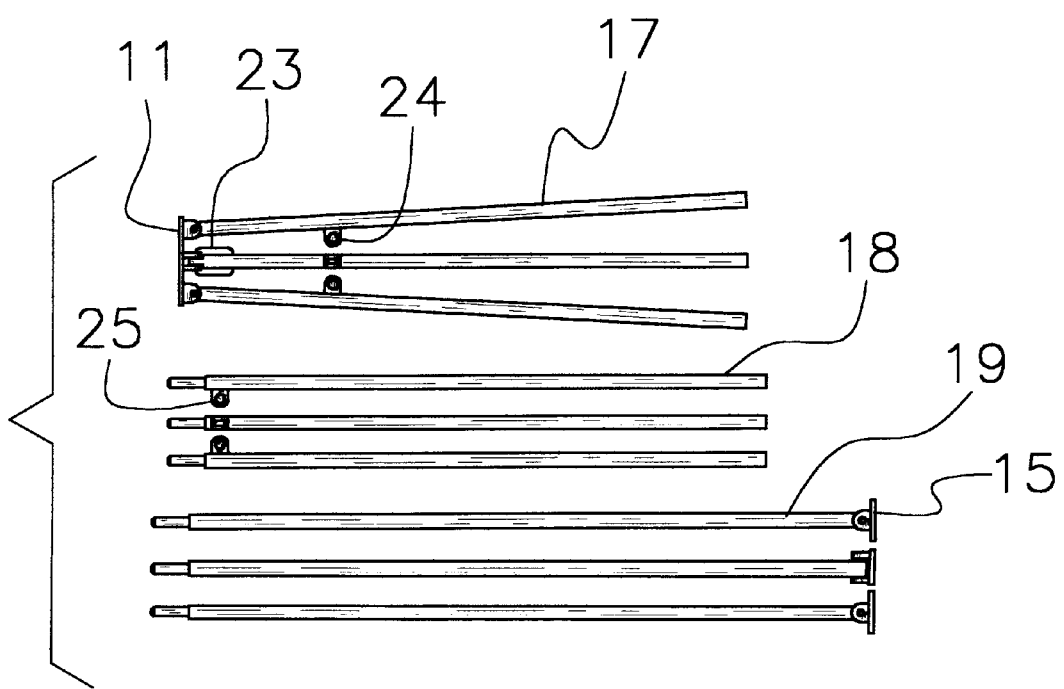
FIG. 4 is a schematic side view of the portions of the poles of the present invention in their separated form for easier carrying of the poles.

With reference to FIG. 4, ideally, each of the poles has separable elongate upper, middle and lower portions 17,18, 19. The upper portion 17 of each pole is positioned adjacent the upper end of the respective pole. The lower portion 19 of each pole is positioned adjacent the lower end of the respective pole. The middle portion of each pole is positioned between the upper and lower portions of the respective pole. The middle portion of each pole is detachably attached to the associated upper and lower portions of the respective pole to permit collapsing of the poles for easier carrying by a user and compact storage.

A generally circular platform 20 is positioned between the poles beneath the top plate. The platform has a generally circular outer perimeter, a center, and substantially planar upper and lower surfaces. In use, the platform is designed for supporting a user thereon. Preferably, the centers of the top plate and the platform are generally coaxial to one another. Ideally, the platform has a pair of generally semi-circular portions 21,22 pivotally coupled together along a diameter of the platform to permit folding of the platform for convenient transport and compact storage of the platform.

A pulley system connects the platform to the top plate to permit raising and lowering of the platform between the top plate and the ground surface. The pulley system comprises a locking center pulley 23, a plurality of side pulleys 24,25, and a flexible lifting cable 26. The center pulley is coupled to the bottom face of the top plate. The center pulley has a lock to releasably hold the center pulley against rotation. Each of the poles has a spaced apart pair of the side pulleys coupled thereto which are positioned towards the upper end of the respective pole. One of the side pulleys of each of the poles is preferably positioned on the upper portion of the respective pole and the other of the side pulleys of each of the poles is preferably positioned on the middle portion of the respective pole.

The lifting cable comprises three of lifting strands 27,28, 29 each coupled to a single pulling strand 30. The lifting cable is looped around the center pulley so that the pulling strand is downwardly depended from the center pulley. Each lifting strand is associated with a corresponding pole and looped around the side pulleys of the associated corresponding pole. Each of the lifting strands terminates at a free end distal the pulling strand. The free ends of the lifting strand are spaced apart from one another and are coupled to the upper surface of the platform adjacent the outer perimeter of the platform. In use, pulling downwards of the pulling strand by a user on the platform pulls the lifting strands towards the center pulley to lift the platform upwards. Conversely, releasing the pulling strand lowers the platform.

Figure 2:
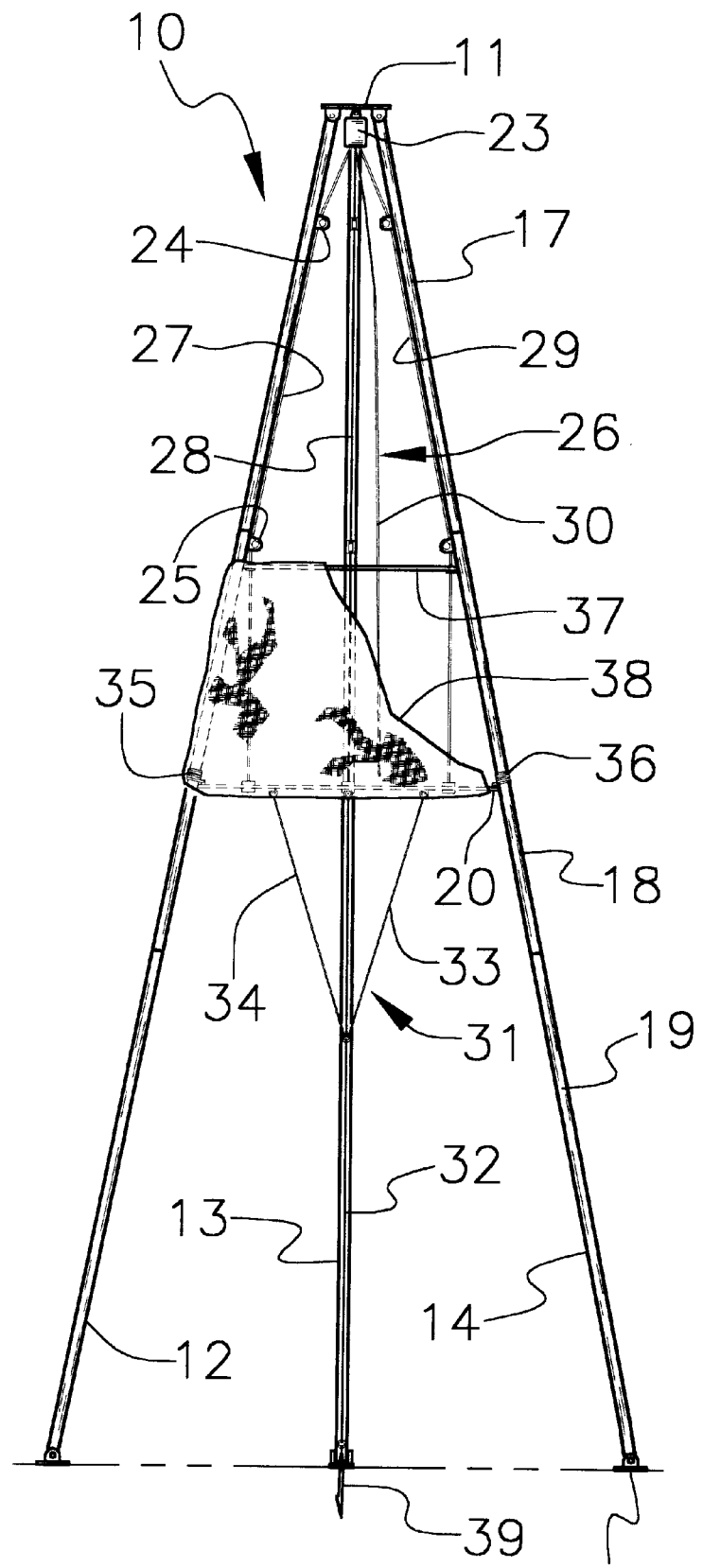
FIG. 2 is a schematic side view of the present invention with the curtain shown in breakaway and the platform lifted towards the top plate.
Figure 3:
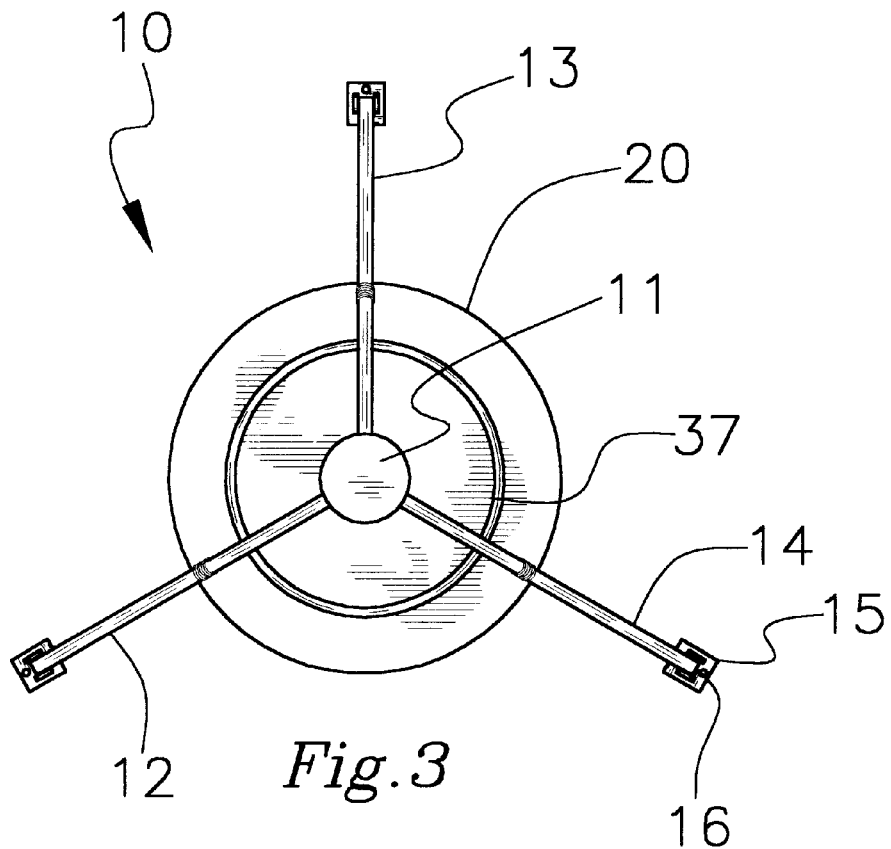
FIG. 3 is a schematic top view of the present invention.

Preferably, a flexible elongate anchor cable 31 is provided with an elongate lower strand 32 and a plurality of elongate upper strands 33,34 extending from the lower strand. The lower end of the lower strand of the anchor cable is coupled to its own ground spike 39 inserted into the ground surface to secure the lower strand to the ground surface. The upper strands of the anchor cable are coupled to the lower surface of the platform. With reference to FIGS. 1 and 2, in use, as the platform is lifted upwards, the anchor cable become more taught to help hold the platform against swinging.

The poles each preferably have a resiliently coiled spring 35,36 wrapped therearound. Each of the coiled springs has a free end extending from the respective pole. The free ends of the coiled springs are coupled to the outer perimeter of the platform with the free ends of the coiled springs spaced apart from one another along the outer perimeter of the platform. In use, lifting of the platform permits an extended portion of each coiled spring adjacent the free end of the respective coiled spring to be wrapped around the associated pole. Conversely, lowering the platform caused the coiled spring to unwind from around the associated pole to increase the length of the extended portion of the respective spring. The resiliently coiled springs are designed for helping hold the platform in alignment with the top plate and resist swinging of the plate.

Preferably, a generally open circular support ring 37 is spaced above the upper surface of the platform and coupled to the lifting strands of the lifting cable of the pulley system.

A flexible curtain 38 is depended from the support ring and draped around the outer perimeter of the platform. The curtain is coupled to both the support ring and the outer perimeter of the platform. Ideally, the curtain has a camouflage decorated exterior surface to help reduce the visible detection of the curtain and a user on the platform. Optionally, a resilient cage may be provided having a plurality of resilient rods extending between the support ring and the outer perimeter of the platform with the curtain disposed around the cage. In use, this cage keeps the curtain from blowing inwards from the wind.

In an ideal illustrative embodiment, each of the poles has a length of about 16 feet, the platform has an outer diameter of about three feet, and the top plate has an outer perimeter of about 6 inches.

As to a further discussion of the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

I claim:

1. A stand, comprising:
   a top plate;
   a plurality poles each having opposite upper and lower ends;
   said upper ends of said being pivotally coupled to a bottom face of said top plate;
   a platform being positioned between said poles beneath said top plate;
   a pulley system connecting said platform to said top plate to permit raising and lowering of said platform with respect to said top plate; and
   wherein said pulley system comprises a center pulley, a plurality of side pulleys and a flexible lifting cable, said center pulley being coupled to said top plate, each of said poles having a spaced apart pair of said side pulleys coupled thereto, said lifting cable comprising a plurality of lifting strands coupled to a pulling strand, said lifting cable being, looped around said center pulley, said pulling strand being downwardly depended from said center pulley, each lifting strand being associated with a corresponding pole, each lifting strand being looped around said side pulleys of the associated corresponding pole, each of said lifting strands terminating at a free end distal said pulling strand, said free ends of said lifting strand spaced apart from one another and being coupled to said platform.

2. The stand of claim 1, wherein said plurality of poles comprises three poles.

3. The stand of claim 1, wherein each of said poles has a ground engaging foot pivotally coupled to said lower end of the respective pole.

4. The stand of claim 3, wherein said foot of each of said poles has a hole therethrough, each of said foot having a ground spike being extended through said hole of the respective foot.

5. The stand of claim 1, wherein each of said poles has separable elongate upper, middle and lower portions, said upper portion of each pole being positioned adjacent said upper end of the respective pole, said lower portion of each pole being positioned adjacent said lower end of the respective pole, and said middle portion of each pole being positioned between said upper and lower portions of the respective pole, said middle portion of each pole being detachably attached to the associated upper and lower portions of the respective pole.

6. The stand of claim 1, wherein said top plate and said platform are generally coaxial to one another.

7. The stand of claim 1, wherein said center pulley has a lock to releasably hold said center pulley against rotation.

8. The stand of claim 1, further comprising a flexible elongate anchor cable having an elongate lower strand and a plurality of elongate upper strands extending from said lower strand, said lower strand of said anchor cable being coupled to a ground spike, said upper strands of said anchor cable being coupled to a lower surface of said platform.

9. The stand of claim 1, wherein said poles each have a resiliently coiled spring wrapped therearound, each of said coiled springs having a free end extending from the respective pole, said free ends of said coiled springs being coupled to said platform.

10. The stand of claim 1, further comprising a generally circular support ring being spaced above an upper surface of said platform, said support ring being coupled said pulley system.

11. The stand of claim 10, further comprising a flexible curtain being depended from said support ring around said platform.

12. A stand, comprising:
   a generally circular top plate having a center and substantially planar top and bottom faces;
   a plurality elongate poles each having opposite upper and lower ends and longitudinal axis extending between said upper and lower ends of the respective pole, wherein said plurality of poles comprises three poles;
   said upper ends of said being pivotally coupled to said bottom face of said top plate;
   each of said poles having a ground engaging foot pivotally coupled to said lower end of the respective pole, said feet of said poles being for resting on a ground surface such that said poles upwardly extend from the ground surface;
   said feet of said poles each having a generally circular hole therethrough;
   each of said feet of said poles having a ground spike being extended through said hole of the respective foot into the ground surface to anchor each foot to the ground surface;
   each of said poles having separable elongate upper, middle and lower portions;
   said upper portion of each pole being positioned adjacent said upper end of the respective pole;
   said lower portion of each pole being positioned adjacent said lower end of the respective pole;
   said middle portion of each pole being positioned between said upper and lower portions of the respective pole;
   said middle portion of each pole being detachably attached to the associated upper and lower portions of the respective pole;

a generally circular platform being positioned between said poles beneath said top plate;

said platform having a generally circular outer perimeter, a center, and substantially planar upper and lower surfaces;

said centers of said top plate and said platform being generally coaxial to one another;

a pulley system connecting said platform to said top plate to permit raising and lowering of said platform between said top plate and the ground surface;

said pulley system comprising a center pulley, a plurality of side pulleys, and a flexible lifting cable;

said center pulley being coupled to said bottom face of said top plate, said center pulley having a lock to releasably hold said center pulley against rotation;

each of said poles having a spaced apart pair of said side pulleys coupled thereto, said side pulleys of said poles being positioned towards said upper end of the respective pole;

one of said side pulleys of each of said poles being positioned on said upper portion of the respective pole, the other of said side pulleys of each of said poles being positioned on the middle portion of the respective pole;

said lifting cable comprising a plurality of lifting strands coupled to a pulling strand, said lifting cable being looped around said center pulley, said pulling strand being downwardly depended from said center pulley;

each lifting strand being associated with a corresponding pole, each lifting strand being looped around said side pulleys of the associated corresponding pole;

each of said lifting strands terminating at a free end distal said pulling strand, said free ends of said lifting strand spaced apart from one another and being coupled to said upper surface of said platform adjacent said outer perimeter of said platform;

a flexible elongate anchor cable having an elongate lower strand and a plurality of elongate upper strands extending from said lower strand;

said lower strand of said anchor cable being coupled to a ground spike inserted into the ground surface to secure said lower strand to the ground surface, said upper strands of said anchor cable being coupled to said lower surface of said platform;

said poles each having a resiliently coiled spring wrapped therearound, each of said coiled springs having a free end extending from the respective pole, said free ends of said coiled springs being coupled to said outer perimeter of said platform, said free ends of said coiled springs being spaced apart from one another along said outer perimeter of said platform;

a generally circular support ring being spaced above said upper surface of said platform, said support ring being coupled to said lifting strands of said lifting cable of said pulley system; and a flexible curtain being depended from said support ring around said outer perimeter of said platform.

\* \* \* \* \*